United States Patent [19]

Smisson

[11] Patent Number: 5,116,516

[45] Date of Patent: May 26, 1992

[54] GRAVITATIONAL SEPARATOR FOR SEPARATING SOLID COMPONENTS OUT OF A LIQUID MIXTURE

[75] Inventor: Robert P. M. Smisson, Clevedon, United Kingdom

[73] Assignee: Hydro International Limited, United Kingdom

[21] Appl. No.: 668,980

[22] Filed: Mar. 12, 1991

[30] Foreign Application Priority Data

Mar. 16, 1990 [GB] United Kingdom .............. 9005977

[51] Int. Cl.$^5$ ...................... B01D 21/02; B01D 21/24
[52] U.S. Cl. .................................. 210/747; 210/787;
210/788; 210/800; 210/170; 210/512.1;
210/537; 210/538
[58] Field of Search .............. 210/747, 787, 788, 800,
210/170, 512.1, 537, 538

[56] References Cited

U.S. PATENT DOCUMENTS

| | | | |
|---|---|---|---|
| 2,364,405 | 12/1944 | Trimbey | 210/787 |
| 3,136,724 | 6/1964 | Lind et al. | 210/537 |
| 3,480,543 | 11/1969 | Hildebrand | 210/208 |
| 3,965,013 | 6/1976 | Jackson | 210/519 |
| 4,107,038 | 8/1978 | Weis | 210/532.1 |
| 4,146,468 | 3/1979 | Wilson | 210/512.1 |
| 4,146,471 | 3/1979 | Wyness | 210/220 |
| 4,517,091 | 5/1985 | Yamanaka et al. | 210/512.1 |
| 4,519,848 | 5/1985 | Underwood | 210/512.1 |
| 4,532,034 | 6/1985 | Hans et al. | 210/512.1 |
| 4,576,720 | 5/1986 | Mandt | 210/626 |
| 5,021,153 | 6/1991 | Haws | 210/537 |

FOREIGN PATENT DOCUMENTS

| | | |
|---|---|---|
| 3105081 | 9/1982 | Fed. Rep. of Germany . |
| 3529760 | 2/1987 | Fed. Rep. of Germany . |
| 2082941A | 3/1982 | United Kingdom . |
| 2082941 | 3/1982 | United Kingdom . |
| 2148744 | 6/1985 | United Kingdom . |
| 2152401 | 8/1985 | United Kingdom . |
| 2153261 | 8/1985 | United Kingdom . |
| 2158741 | 11/1985 | United Kingdom . |
| 2189413 | 10/1987 | United Kingdom . |
| 2213400 | 8/1989 | United Kingdom . |
| 2223957 | 4/1990 | United Kingdom . |
| 2223958 | 4/1990 | United Kingdom . |
| 2233255 | 9/1991 | United Kingdom . |

*Primary Examiner*—W. Gary Jones
*Attorney, Agent, or Firm*—Larson and Taylor

[57] ABSTRACT

There is described a low energy separator for separating solid components out of a liquid mixture, comprising (a) a vessel having a cylindrical outer wall and a base at one end, (b) a body which is provided within the vessel and which defines with the base an annular opening spaced from the outer wall, (c) an inlet for introducing the liquid mixture into the vessel said inlet opening directly into the vessel, (d) an outlet in the upper region of the vessel for removing from the vessel liquid from which solid components have been separated, (e) a primary annular dip plate extending downwardly toward the base from an upper region of the vessel and spaced from the outer wall of the vessel, and (f) means for promoting a rotational movement of liquid and suspended solids within the vessel, said rotational movement being sufficient to cause or enhance an inward sweeping effect towards the annular opening on solids accumulated at the base of the vessel, while being of sufficiently low energy that separation of the solids components of the liquid in the vessel is brought about primarily by gravity; characterized in that the separator also includes a central upper chamber and a means for trapping and concentrating buoyant solids material which have already entered the vessel in said central upper chamber.

11 Claims, 4 Drawing Sheets

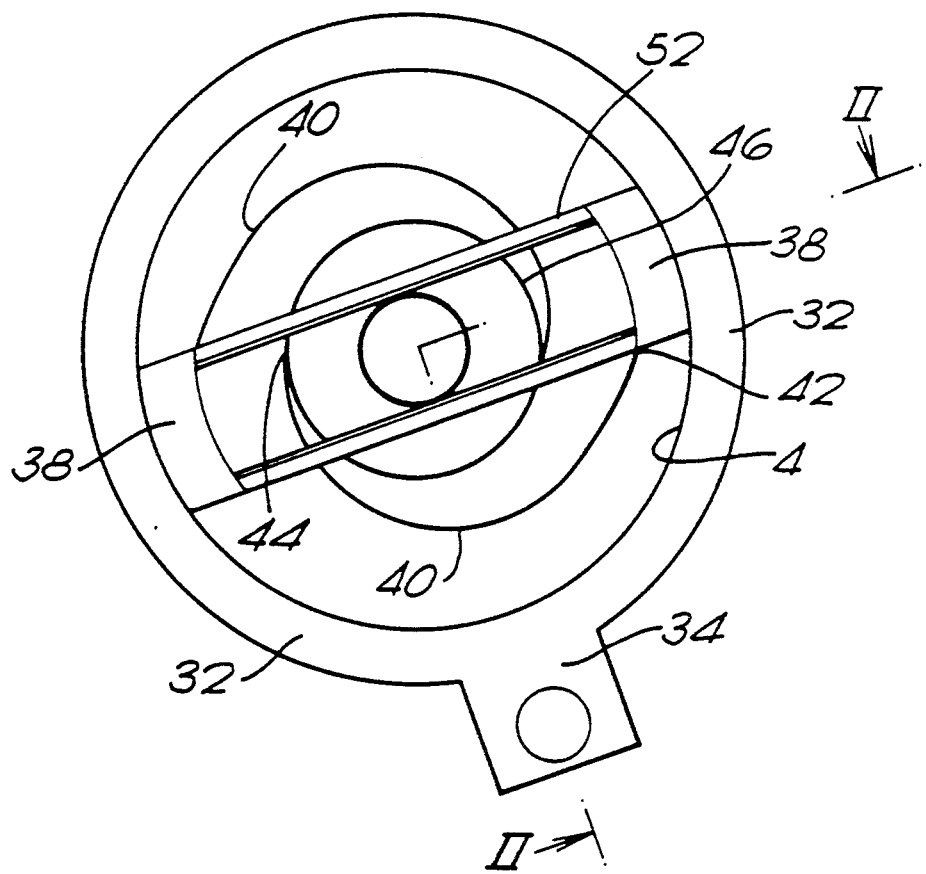
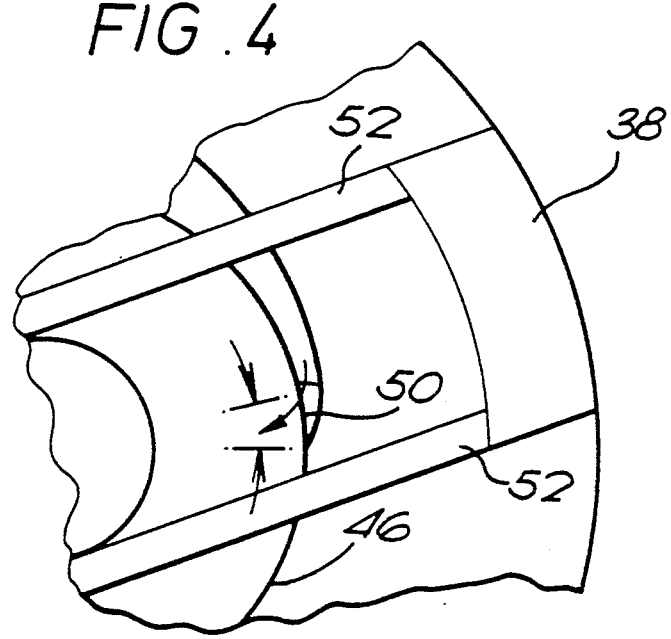

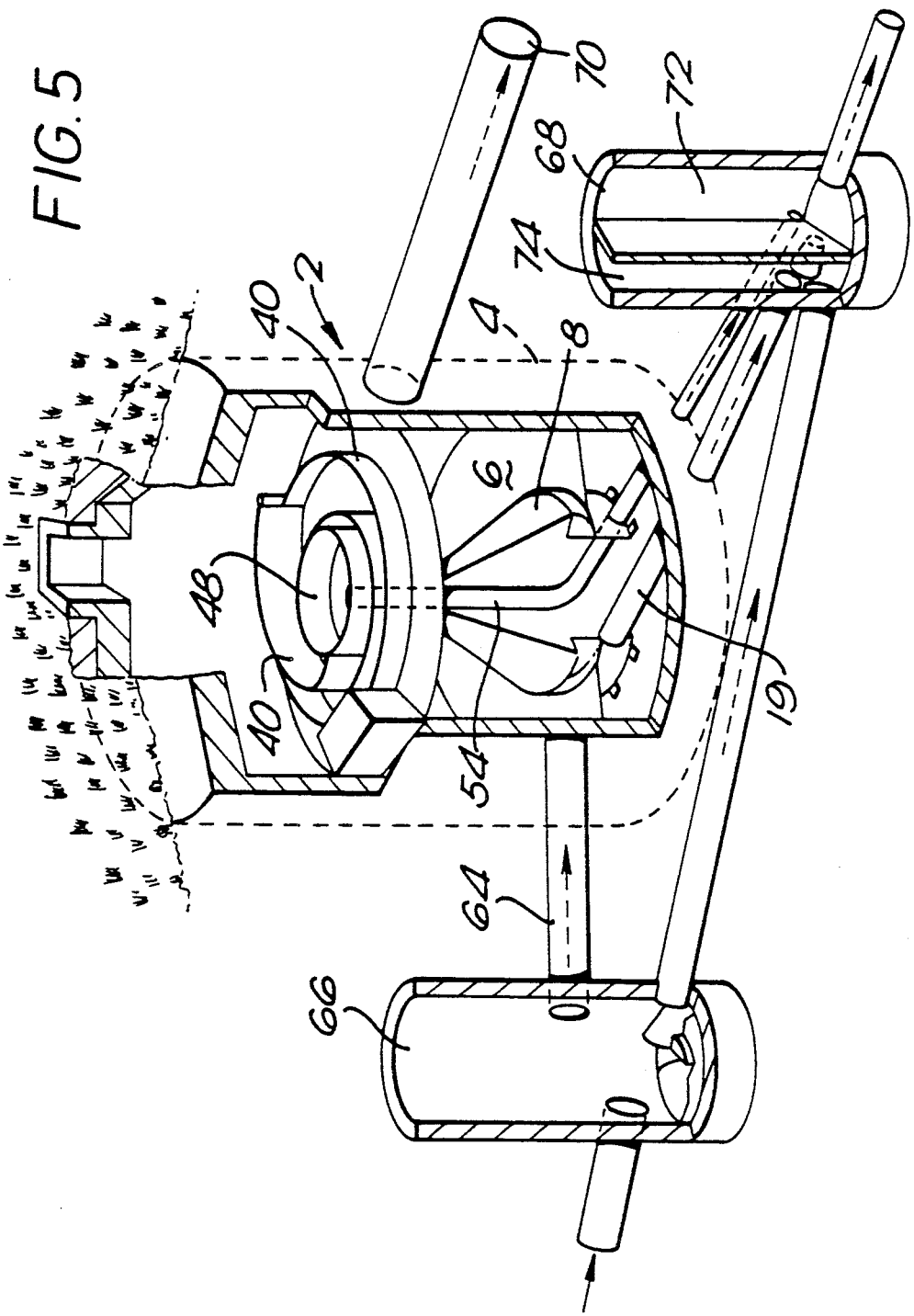

GRAVITATIONAL SEPARATOR FOR SEPARATING SOLID COMPONENTS OUT OF A LIQUID MIXTURE

This invention relates to a separator capable of operating at low energy for separating solid components out of a liquid mixture and is more particularly, but not exclusively, concerned with improving the separator's ability to trap floatable materials thereby to avoid undue contamination of the clean liquid being removed from the separator.

Our British Patent No. 2082941 discloses a separator which is particularly suitable for separating, for example, sewage and other solid matter from water in storm water overflows. The separator is in the form of a cylindrical vessel having an inlet which is disposed tangentially so as to promote a circulating flow within the vessel. This circulating flow comprises an outer, relatively fast, flow and an inner, relatively slow, flow. The shear zone between these two regions is stabilised by an annular dip plate which projects downwardly from the top of the vessel. A flow modifying member is provided in the vessel to enhance the removal of solid particles accumulating at the bottom of the vessel to a central outlet. Clean water is removed from the top of the vessel. In the vessel shown in our British Patent No. 2082941 a floatables trap is provided directly above the inlet and opposite the outlet in order to reduce the possibility of floatable solids being discharged through the clean water outlet. It is specifically stated that the trap should be disposed anywhere around the circumference of the vortex chamber.

It has been found that, under storm conditions, the floatables trap of the separator disclosed in our British Patent No. 2082941, whilst performing satisfactorily for the majority of the time, may permit buoyant material to reach the outlet, by passing under the annular dip plate to reach a central region of the vessel. From there, the buoyant material may float upwardly toward the outlet in the top of the vessel. It is believed that the phenomenon may occur as the separator is filling during the onset of a storm or, in the alternative, in a lull during a storm when the level of the water in the separator may briefly drop below the level of the dip plate.

DE-A-3529760 (Strate GmbH) relates to a sand or grit trap for separation of sediment from waste water. The apparatus described includes a collecting zone for floatable material in or on the waste water. The collecting zone is directly connected to the waste water inlet. An off-take line is provided to direct floatable material collected away from the collection zone.

It is now proposed to provide a low energy separator of the general type described in our British Patent No. 2082941 in which buoyant material which succeeds in passing under the dip plate is collected at an upper region of the vessel and concentrated in a central upper chamber.

Thus, in accordance with a first aspect of the present invention there is provided a low energy separator for separating solid components out of a liquid mixture, comprising (a) a vessel having a cylindrical outer wall and a base at one end, (b) a body which is provided within the vessel and which defines with the base an annular opening spaced from the outer wall, (c) an inlet for introducing the liquid mixture into the vessel and opening directly into the vessel, (d) an outlet in the upper region of the vessel for removing from the vessel liquid from which solid components have been separated, (e) a primary annular dip plate extending downwardly towards the base from an upper region of the vessel and spaced from the outer wall of the vessel, and (f) means for promoting a rotational movement of liquid and suspended solids within the vessel, said rotational movement being sufficient to cause or enhance an inward sweeping effect towards the annular opening on solids accumulated at the base of the vessel, whilst being of sufficiently low energy that separation of the solids components of the liquid in the vessel is brought about primarily by gravity; characterised in that the separator also includes a central upper chamber and a means for trapping and concentrating in said central upper chamber buoyant solids material within the vessel.

The present invention contrasts with DE-A-3529760 in which the means to trap the floating material communicates directly with the inlet. This suffers from the disadvantage that as flow hits the guiding plate, the surface flow slows down and a small wave forms. This can generate a vertical flow down the front face of the plate so that some flow is skimmed off the surface, drawn down the face of the plate and discharged into the main flow below the guiding plate; this can enable some floatable material to escape.

In a preferred embodiment of the present invention, the outlet in the upper region of the vessel is in the form of a circumferential (or part circumferential) weir over which liquid from which solid components have been separated spills. The weir defines an upper liquid surface when the separator is filled. Liquid may spill over the weir into a circumferential trough having an outlet via which the cleaned liquid is removed.

The means for concentrating buoyant solids material in the central upper chamber may take the form of a deflector plate arranged in the upper region of the vessel to collect buoyant material moving toward the outlet weir and direct that buoyant material into the central upper chamber. For this purpose, the central upper chamber may be provided with a suitable opening.

An effective form of deflector plate has been found to be one which extends downwardly from a position above the liquid surface in the vessel (i.e. above the level of the circumferential weir where this constitutes the outlet) and into the vessel for a short distance. The bottom of the deflector plate will preferably define a relatively narrow slot with a horizontal baffle in the upper region of the vessel, this minimizes the chance of any buoyant material passing beneath the deflector plate.

In its most preferred form, the deflector plate extends from a first radial position of the vessel to a second radial position of the vessel in an arcuate fashion, wherein the second radial position is further inward of the vessel than the first radial position. The deflector plate may therefore be regarded as a part of a spiral. The first and second radial positions may be about 180° apart. More than one such deflector plate may be provided. For instance, two deflector plates may be provided with the first radial position in respect of one deflector plate being on approximately the same radius of the vessel as the second radial position of the other deflector plate, and vice versa.

The deflector plates, which may be fabricated of a sheet metal such as steel, may be supported by beams which themselves may be supported by the outer walls or other suitable supporting means of the vessel.

In the most highly preferred embodiment of the present invention, the or each of the deflector plates extends from the first radial position to the second radial position, the second radial position abutting the outside of the central upper chamber and communicating at that position with the inside of the chamber via the aforementioned opening.

In order to create a flow toward the central upper chamber of the vessel, the chamber may be provided with an outlet via which liquid in the chamber may be removed, for instance under gravity. For instance, a separate duct may be connected to the outlet in the upper chamber and lead out of the vessel to a drainage point. Liquid draining out of the upper chamber via the duct will tend to cause a flow of liquid into the upper chamber thereby drawing buoyant material collected by the deflector plate into the chamber.

It has been surprisingly found that the efficiency of separation of buoyant floatable material from liquid in the vessel may be enhanced by the provision of a deflector plate projecting from the outer wall generally in the direction of flow in the vessel. The deflector plate should be in the vessel above the base but generally in the lower portion of the vessel. It has been found that this deflector plate enhances separation of floatable material when it is positioned approximately in the second quadrant of the vessel, as measured from the inlet in the direction of the rotation of fluid in the vessel. It is theorized that the advantages given by this deflector plate may arise from the stabilizing effects which the plate has on standing wave formation occurring in liquid in the vessel around the circumference of the vessel. It has been found that, for the best results, the termination of the deflector plate should be positioned at an angle of approximately 140° from the point at which liquid enters the vessel, in the direction of flow of liquid in the vessel.

The arrangement of the present invention has been found to be very effective in separating from liquid in the vessel material which is neutrally buoyant; materials such as condoms, sanitary towel backings, cotton bud sticks, etc..

The separator of the present invention may also find utility in a froth floatation process in which useful minerals are separated from an ore by crushing and a subsequent frothing process. The buoyant froth containing the desirable fraction may be collected and concentrated in the upper chamber of the present device and offers an improvement over prior art procedures.

In the present description, the expression "buoyant material" means a material which, to a more or less degree, has a measure of buoyancy in the sense that it does not sink in the separator. Some materials may be buoyant under particular conditions (such as lower rotational velocities) in the vessel.

According to a second aspect of the invention there is provided a low energy separator for separating solid components out of a liquid mixture, comprising (a) a vessel having a cylindrical outer wall and a base at one end, (b) a body which is provided within the vessel and which defines with the base an annular opening spaced from the outer wall, (c) an inlet for introducing the liquid mixture into the vessel said inlet opening directly into the vessel, (d) an outlet in the upper region of the vessel in the form of a circumferential or part circumferential weir over which liquid from which solid components have been separated is removed and which defines an upper liquid surface when the separator is filled, (e) a primary annular dip plate extending downwardly toward the base from an upper region of the vessel and spaced from the outer wall of the vessel, and (f) means for promoting a rotational movement of liquid and suspended solids within the vessel, said rotational movement being sufficient to cause or enhance an inward sweeping effect toward the annular opening on solids accumulated at the base of the vessel, whilst being of sufficiently low energy that separation of solids components of the liquid in the vessel is brought about primarily by gravity; characterised in that the separator also includes a central upper chamber having an opening into the vessel and a deflector plate arranged in the upper region of the vessel to collect buoyant material already within the vessel and moving toward the circumferential weir and direct said buoyant material into the central upper chamber via said opening.

Also within the scope of the present invention are methods of separation employing the separators of the present invention.

For a better understanding of the present invention and to shown how the same may be carried into effect, reference will now be made, by way of example, to the accompanying drawings in which:

FIG. 1 is a top view of a separator in accordance with the present invention;

FIG. 4 is an enlarged top view of part of the separator shown in FIG. 1; and

FIG. 5 is a perspective view showing the separator of the present invention in use as part of a storm water overflow system.

Figure 2:
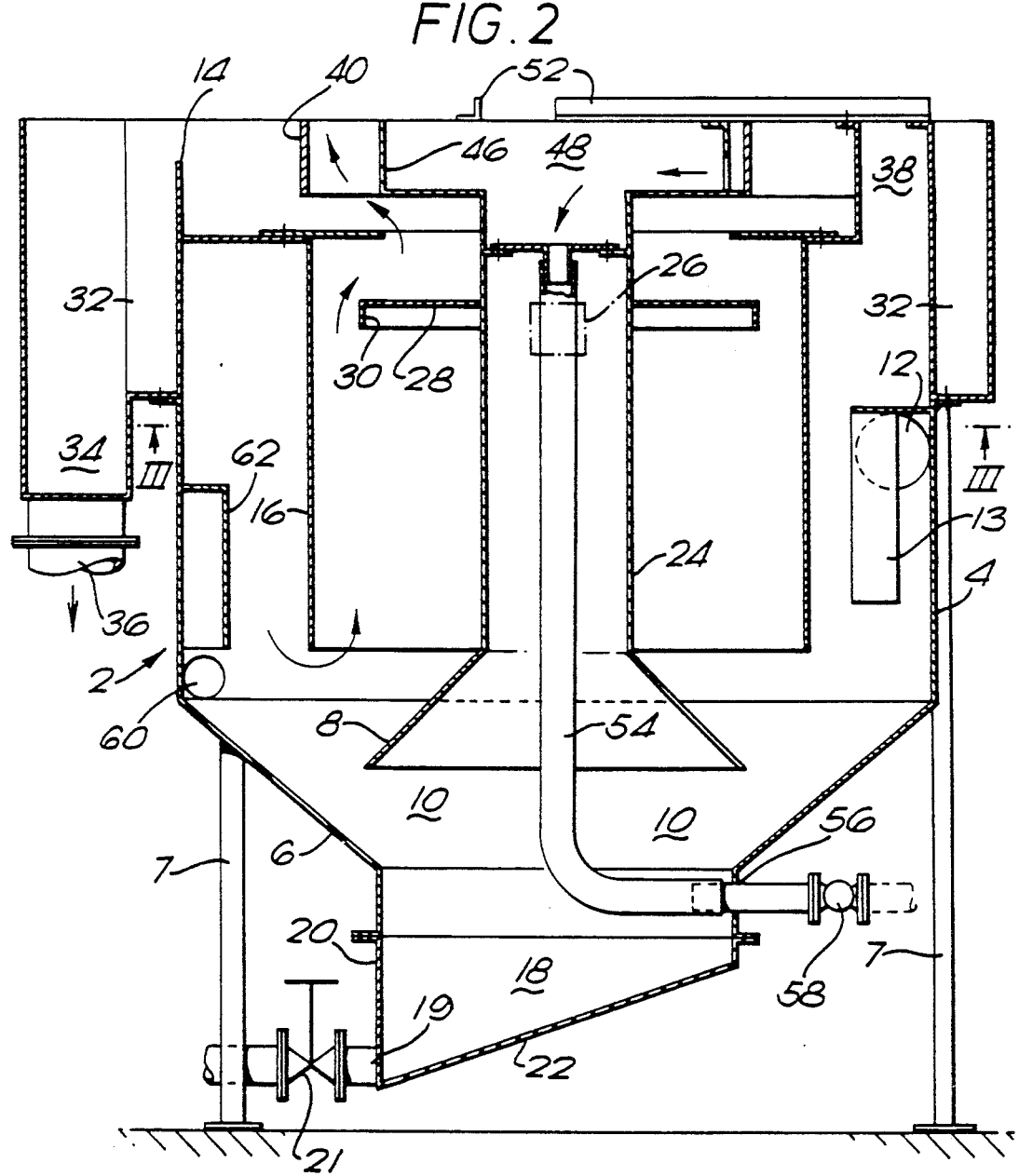
FIG. 2 is a cross-section through the separator of FIG. 1 taken along the line II—II in FIG. 1.
Figure 3:
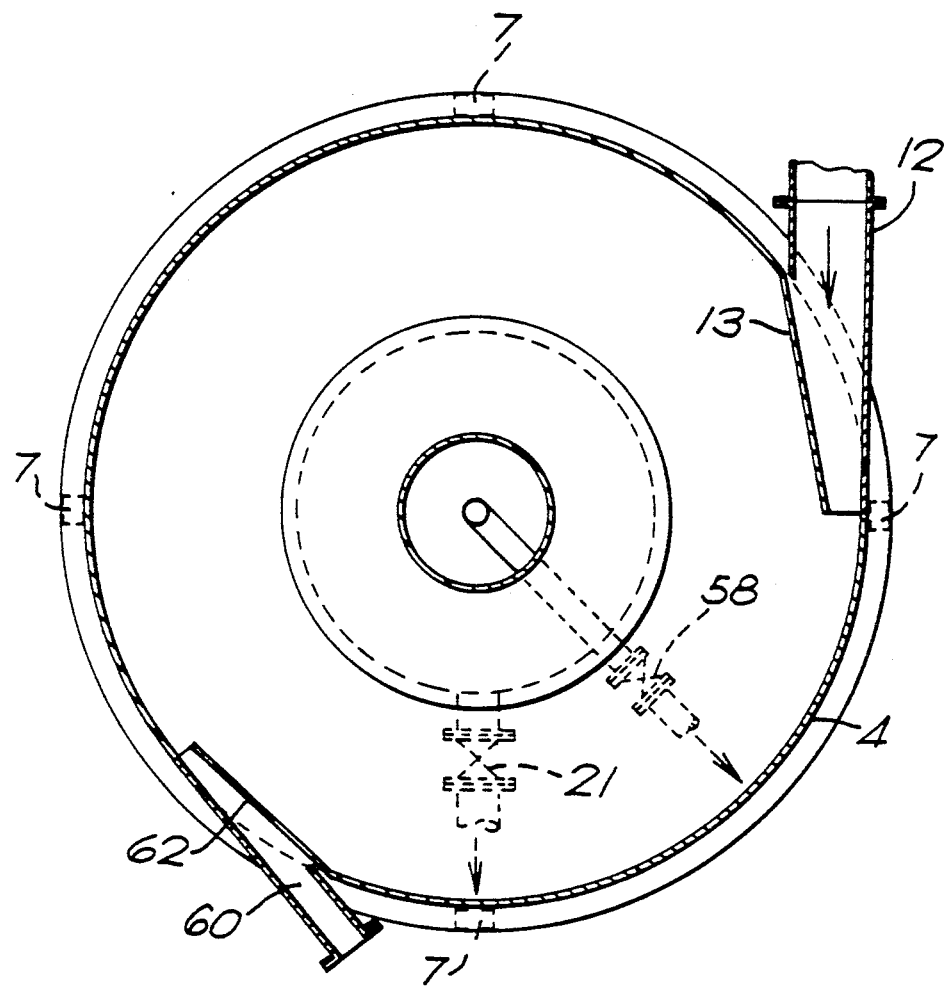
FIG. 3 is a cross-section taken along the line III—III in FIG. 2.

The separator illustrated in FIGS. 1 to 4 comprises a vessel 2 having a cylindrical outer wall 4 and a base 6. The separator is supported on legs 7. A body 8 is provided within the vessel, the body 8 being in the form of a hollow inverted cone. The body 8 defines with the base 6 an annular opening 10 which is spaced from the outer wall 2. A tangential inlet 12 is provided for introducing a liquid mixture directly into the vessel 2. The inlet 12 includes a deflector plate 13 for directing the flow of liquid around the circumference of the vessel 2. An upper edge 14 of the cylindrical wall 4 of the vessel 2 constitutes an outlet in the upper region of the vessel 2 for removing from the vessel 2 liquid from which solid components have been separated. This upper edge 14 constitutes a peripheral, circumferential weir.

Projecting downwardly towards the base 6 from an upper region of the vessel 2 there is provided a primary annular dip plate 16. At the bottom of the vessel there is provided a solids collection region 18 defined by a cylindrical side wall 20 and a sloping base 22. The solids collection region 18 has an outlet duct 19 controlled by a valve 21.

The body 8 in the vessel is supported by a stem 24 which is also hollow. The stem is provided with four square holes 26 (only one shown) at an upper region thereof. Supported on the stem 24 is a baffle 28 which has a down turned flange 30 for purposes of providing rigidity.

Surrounding the outer wall 4 there is a circumferential chamber 32 into which liquid spills over the circumferential weir 14. The channel 32 communicates with a trough 34 having an outlet 36.

Primary floatables traps 38 are provided outside the annular dip plate 16.

In order to trap floatable or buoyant materials which evade traps 38, a secondary floatables trap is provided in an upper region of the vessel. This trap is constituted by two spiralling deflector plates 40 which project downwardly into the liquid in the vessel 2 for a short distance. Each deflector plate extends from a first radial position 42 to a second radial position 44 which is inward of the first radial position 42. The deflector plates abut the outside wall 46 of a central chamber 48. This central chamber 48 has small slots 50 (see FIG. 4) where the deflector plates 40 meet the outer wall 46 of the chamber 48. The deflector plates are supported on beams 52.

Communicating with the central chamber 48 is a duct 54 which extends downwardly of the vessel through the central stem 24 of the vessel, through a sealed outlet 56 and is controlled by a valve 58.

Finally, the vessel may be provided with a further inlet 60 by which an energizing fluid may be introduced into the vessel in a manner to create or enhance a rotational movement of liquid in the vessel. This inlet is preferably tangential. It is also preferred that the inlet 60 is accompanied by a deflector plate 62 for ensuring laminar flow of the energising liquid. More details of the "added energy" feature may be found in our published British patent application GB-2158741 which is incorporated herein by reference.

The use of the separator in accordance with the present invention is best described with reference to FIG. 5, as well as the other figures described above. Under normal dry conditions, there is a combined inflow from the foul sewer to a first manhole 66. This flow ordinarily bypasses the separator via bypass duct 67 which leads to a second manhole 68. Accordingly, the liquid flow all passes to a treatment works. Under storm conditions, the level in manhole 66 will rise and liquid will build up in the manhole 66 generating a pressure head which causes a flow of liquid via inlet duct 64 into the vessel via inlet 12 (not shown in FIG. 5). During storm condition this will proceed to fill the vessel 2 with the liquid mixture. The outlet to the vessel in the base will ordinarily be set to permit a predetermined rate of flow via outlet duct 18 out of the vessel 2 to second manhole 68. Once the flow of liquid mixture into the vessel 2 via tangential inlet 12 exceeds this value, liquid mixture begins to accumulate in the vessel 2 and, as the vessel 2 fills, the liquid in the vessel 2 will be given a rotational movement by virtue of the tangential orientation of the inlet 12. Eventually, the conditions will be such that the vessel 2 is filled with the liquid mixture, the upper level of liquid in the vessel 2 being defined by the circumferential weir 14 constituting an upper outlet to the vessel 2. In accordance with the principles described in our British Patent No. 2082941, the liquid is separated from solid material in the vessel by virtue of the low energy characteristics of the rotational movement of the liquid in the vessel. Thus, solids material (e.g. excreta) fall under gravity towards the base 6 and there it is swept toward the annular slot 10 between the flow modifying member 8 and the base 6 and thence to the central collection region 18. The solids are removed via duct 19 to second manhole 68. Meanwhile, clear liquid is removed from the top of the vessel 2 via the circumferential outlet 14 and the outlet pipe 36 to a duct 70 which leads to an overflow basin, such as a river.

Ordinarily, floatables material entering the vessel 2 through inlet 12 will be sufficiently buoyant to flow directly upwardly in the region of the vessel 2 which is outward of the annular dip plate 16. These floatables material will therefore be collected in the floatables trap 38 and will remain there until the storm subsides when they will descend with liquid in the vessel and be removed via the outlet 18 in the base 6 of the vessel 2 to the second manhole 68 and from there to the treatment works. However, some buoyant material, particularly material which is classified as neutrally buoyant, for instance condoms, the backing of sanitary towels and hyperdermic syringes, may manage to flow below the primary dip plate 16 and enter the central region of the vessel. In this instance, it will float upwardly following the path of the arrows in FIG. 2 and, in the absence of any trap, this buoyant material would float over the circumferential weir 14 to the outlet 36 from which cleaned water is removed. In order to trap and concentrate this buoyant material, the spiral deflector plates 40 are provided to trap the buoyant material and direct the buoyant material, which will have a rotational component, towards the slots 50 in the outer wall 46 of the central chamber 48. The floatables material will therefore collect in the central region 48. Liquid in the chamber 48 will be drawn under gravity via the duct 54 out of the vessel to the second manhole 68. The duct 54 emerges into a section 72 of the manhole 68 separate from the section 74 in which the dry weather bypass 66 and outlet duct 19 emerge. A flow control valve is paced between these two sections 72, 74.

It has been found that the most highly buoyant material is trapped in the normal floatables traps 38. Less buoyant material will rise under the internal baffle 30 and pass through the holes 26 in the stem 24 and collect inside the stem. This material will be removed via the bottom of the vessel 2 when the vessel 2 empties. More neutrally buoyant material will pass directly through the dynamic separation region but at the lower velocities at the top of the vessel 2 will be trapped by deflector plates 40 and collect in the central chamber 48 from which it will be removed, through the bottom of the vessel 2 when the vessel 2 empties. By virtue of the duct 54 communicating with the chamber 48, there will be a flow of liquid into the chamber 48 thereby drawing buoyant material towards the chamber 48. When the storm subsides, the buoyant material in the chamber 48 will flow downwardly through the duct 54 and exit the separator to the normal foul manhole 68.

I claim:

1. A low energy separator for separating solid components out of a liquid mixture, comprising (a) a vessel having a cylindrical outer wall and a base at one end, (b) a body which is provided within the vessel and which defines with the base an annular opening spaced from the outer wall, (c) an inlet for introducing the liquid mixture into the vessel, said inlet opening directly into the vessel, (d) an outlet in the upper region of the vessel for removing from the vessel liquid from which solid components have been separated, (e) a primary annular dip plate extending downwardly towards the base from an upper region of the vessel and spaced from the outer wall of the vessel, and (f) means for promoting a rotational movement of liquid and suspended solids within the vessel, said rotational movement being sufficient to cause or enhance an inward sweeping effect towards the annular opening on solids accumulated a the base of the vessel, whilst being of sufficiently low energy that separation of the solids components of the liquid in the vessel is brought about primarily by gravity; said separator further including a central upper chamber and a deflector plate arranged in an upper region of the vessel to collect buoyant material moving toward the outlet, and to direct said buoyant material into the central upper chamber, the deflector plate extending in an arcuate manner from a first radial position of the vessel to a second radial position of the vessel, and said second radial position being further inward of the vessel than the first radial position.

2. A separator in accordance with claim 1, wherein the outlet in the upper region of the vessel is in the form of a circumferential, or part circumferential, weir.

3. A separator according to claim 1, wherein the central upper chamber is provided with openings through which trapped solids material may enter the chamber.

4. A separator according to claim 1, wherein the deflector plate has a bottom edge which defines a relatively narrow slot with a horizontal baffle in the upper region of the vessel.

5. A separator according to claim 1, wherein the upper chamber is provided with an outlet via which liquid in the upper chamber may be removed.

6. A separator according to claim 5, wherein the outlet is provided with an outlet duct.

7. A separator according to claim 1, wherein the outer wall of the vessel is provided on its inner surface with the deflector plate projecting generally in the direction of flow of liquid in the vessel.

8. A separator according to claim 7, wherein said deflector plate is positioned approximately in the second quadrant of the vessel, as measured from the inlet, in the direction of the rotation of liquid in the vessel.

9. A storm water overflow system comprising:
  (i) a low energy separator comprising (a) a vessel having a cylindrical outer wall and a base at one end, (b) a body which is provided within the vessel and which defines with the base an annular opening spaced from the outer wall, (c) an inlet for introducing the liquid mixture into the vessel said inlet opening directly into the vessel, (d) an outlet in the upper region of the vessel for removing from the vessel liquid from which solid components have been separated, (e) a primary annular dip plate extending downwardly towards the base from an upper region of the vessel and spaced from the outer wall of the vessel, and (f) means for promoting a rotational movement of liquid and suspended solids within the vessel, said rotational movement being sufficient to cause or enhance an inward sweeping effect towards the annular opening on solids accumulated at the base of the vessel, while being of sufficiently low energy that separation of the solids components of the liquid in the vessel is brought about primarily by gravity; said separator further including a central upper chamber and a deflector plate arranged in an upper region of the vessel to collect buoyant material moving toward the outlet, and to direct said buoyant material into the central upper chamber, the deflector plate extending in an arcuate manner from a first radial position of the vessel to a second radial position of the vessel, and said second radial position being further inward of the vessel than the first radial position.

10. A method of separating solid components out of a liquid mixture, using a low energy separator comprising (a) a vessel having a cylindrical outer wall and a base at one end, (b) a body which is provided within the vessel and which defines with the base an annular opening spaced from the outer wall, (c) an inlet for introducing the liquid mixture into the vessel, said inlet opening directly into the vessel, (d) an outlet in the upper region of the vessel for removing from the vessel liquid from which solid components have been separated, (e) a primary annular dip plate extending downwardly towards the base from an upper region of the vessel and spaced from the outer wall of the vessel, (f) means for promoting a rotational movement of liquid and suspended solids within the vessel, (g) a central upper chamber within the vessel and (b) deflector plate arranged in an upper region of the vessel to collect buoyant material moving toward the outlet, and to direct said buoyant material into the central upper chamber, the deflector plate extending in an arcuate manner from a first radial position of the vessel to a second radial position of the vessel, and said second radial position being further inward of the vessel than the first radial position;

said method comprising the steps of:
  (i) introducing into said vessel, via the inlet, the liquid mixture;
  (ii) causing or promoting a rotational movement of liquid and suspended solids within the vessel, said rotational movement being sufficient to cause or enhance an inward sweeping effect towards the annular opening on solids accumulated at the base of the vessel, while being of sufficiently low energy that separation of the solids components of the liquid in the vessel is brought about primarily by gravity;
  (iii) using said deflector plate to provide trapping and concentrating in said central upper chamber of buoyant solids material within the vessel; and
  (iv) removing, via the outlet, liquid from which solid components have been separated.

11. A method of separating solid components out of a liquid mixture as claimed in claim 10, wherein the deflector plate extends downwardly in to the vessel from a position above the liquid surface in the vessel, to a position below the liquid surface.

* * * * *